(12) United States Patent
Webster et al.

(10) Patent No.: US 10,847,156 B2
(45) Date of Patent: Nov. 24, 2020

(54) ASSEMBLED VOICE INTERACTION

(71) Applicant: Adobe Inc., San Jose, CA (US)

(72) Inventors: Mark C. Webster, New York, NY (US); Susse Soenderby Jensen, Brooklyn, NY (US); Scott Thomas Werner, Brooklyn, NY (US); Daniel Cameron Cundiff, Brooklyn, NY (US); Blake Allen Clayton Sawyer, Astoria, NY (US)

(73) Assignee: Adobe Inc., San Jose, CA (US)

( * ) Notice: Subject to any disclaimer, the term of this patent is extended or adjusted under 35 U.S.C. 154(b) by 136 days.

(21) Appl. No.: 16/203,526

(22) Filed: Nov. 28, 2018

(65) Prior Publication Data

US 2020/0168217 A1 May 28, 2020

(51) Int. Cl.
*G10L 15/00* (2013.01)
*G10L 15/22* (2006.01)
*G10L 25/51* (2013.01)

(52) U.S. Cl.
CPC .............. *G10L 15/22* (2013.01); *G10L 25/51* (2013.01); *G10L 2015/223* (2013.01); *G10L 2015/225* (2013.01)

(58) Field of Classification Search
CPC ... G10L 15/22; G10L 15/26; G10L 2015/223; G10L 2015/225
See application file for complete search history.

(56) References Cited

U.S. PATENT DOCUMENTS

| 6,360,237 | B1 * | 3/2002 | Schulz | G06F 40/166 |
| | | | | 715/255 |
| 6,738,964 | B1 | 5/2004 | Zink et al. | |
| 7,624,007 | B2 | 11/2009 | Bennett | |
| 8,086,995 | B2 | 12/2011 | Luo et al. | |
| 8,639,032 | B1 * | 1/2014 | Voorhees | G09B 5/02 |
| | | | | 382/176 |

(Continued)

FOREIGN PATENT DOCUMENTS

WO    WO-2006110982    10/2006

OTHER PUBLICATIONS

"Voicegram by Sayspring", Retrieved at: https://www.producthunt.com/posts/voicegram-by-sayspring—on Dec. 5, 2019, 5 pages.

(Continued)

*Primary Examiner* — Edgar X Guerra-Erazo
(74) *Attorney, Agent, or Firm* — SBMC (57) ABSTRACT

Assembled voice interaction techniques are leveraged in a digital medium environment. During a voice interaction with a voice assistant platform, user portions and voice assistant portions of a voice interaction with a voice assistant platform are received and stored in a sequential order. The user portions of the voice interaction, for example, may correspond to audio data or text data indicative of speech included as part of a request to the voice assistant platform. In contrast, the voice assistant portions of the voice interaction may correspond to output content returned by the voice assistant platform for output as part of a response to the request. An assembled voice interaction file is assembled by interleaving the stored user portions of the voice interaction with the stored voice assistant portions of the voice interaction based on the sequential order.

20 Claims, 8 Drawing Sheets

(56) References Cited

U.S. PATENT DOCUMENTS

| | | |
|---|---|---|
| 9,172,738 B1 | 10/2015 | daCosta |
| 9,619,202 B1 | 4/2017 | Weingartner |
| 10,185,556 B2 | 1/2019 | Richstein et al. |
| 10,262,281 B1 | 4/2019 | Vitek et al. |
| 10,379,808 B1 | 8/2019 | Angel et al. |
| 10,423,303 B1 | 9/2019 | Roach et al. |
| 10,531,157 B1 | 1/2020 | Loritsch et al. |
| 2004/0015841 A1 | 1/2004 | Lepejian et al. |
| 2004/0027379 A1 | 2/2004 | Hong Huey et al. |
| 2004/0061722 A1 | 4/2004 | Christopher et al. |
| 2005/0091057 A1 | 4/2005 | Phillips et al. |
| 2006/0235699 A1 | 10/2006 | Dhanakshirur et al. |
| 2008/0154590 A1 | 6/2008 | Doyle |
| 2008/0255845 A1 | 10/2008 | Bennett |
| 2008/0276159 A1* | 11/2008 | Narayanaswami ... G06F 40/169 715/202 |
| 2008/0304632 A1 | 12/2008 | Catlin et al. |
| 2008/0319762 A1 | 12/2008 | Da Palma et al. |
| 2009/0141871 A1 | 6/2009 | Horioka et al. |
| 2011/0022393 A1 | 1/2011 | Waller et al. |
| 2011/0161347 A1 | 6/2011 | Johnston |
| 2011/0202562 A1* | 8/2011 | Bloch .................... G11B 27/34 707/776 |
| 2012/0010876 A1 | 1/2012 | Smolenski et al. |
| 2013/0179173 A1 | 7/2013 | Lee et al. |
| 2013/0317921 A1 | 11/2013 | Havas |
| 2014/0244712 A1 | 8/2014 | Walters et al. |
| 2014/0372892 A1 | 12/2014 | Payzer et al. |
| 2015/0348551 A1* | 12/2015 | Gruber .................... G10L 15/28 704/235 |
| 2015/0350443 A1 | 12/2015 | Kumar et al. |
| 2016/0026608 A1 | 1/2016 | Curin et al. |
| 2016/0307439 A1 | 10/2016 | Selfe et al. |
| 2016/0307575 A1 | 10/2016 | Cha et al. |
| 2017/0018041 A1 | 1/2017 | Fox |
| 2017/0060348 A1 | 3/2017 | Kongot |
| 2017/0140449 A1 | 5/2017 | Kannan |
| 2017/0162198 A1 | 6/2017 | Chaklada |
| 2017/0236512 A1 | 8/2017 | Williams et al. |
| 2017/0308361 A1 | 10/2017 | Brezinsky et al. |
| 2018/0047391 A1 | 2/2018 | Baik et al. |
| 2018/0061420 A1 | 3/2018 | Patil et al. |
| 2018/0108351 A1 | 4/2018 | Beckhardt et al. |
| 2018/0204569 A1 | 7/2018 | Nadkar et al. |
| 2019/0004791 A1 | 1/2019 | Brebner |
| 2019/0005957 A1 | 1/2019 | Yoon |
| 2019/0012625 A1 | 1/2019 | Lawrenson et al. |
| 2019/0066669 A1 | 2/2019 | Sabur et al. |
| 2019/0080698 A1 | 3/2019 | Miller |
| 2019/0082043 A1 | 3/2019 | Lavian et al. |
| 2019/0259386 A1* | 8/2019 | Kudurshian .......... G06F 16/685 |
| 2020/0007680 A1 | 1/2020 | Wozniak |
| 2020/0034492 A1 | 1/2020 | Verbeke et al. |
| 2020/0125475 A1 | 4/2020 | Iyer et al. |
| 2020/0143820 A1* | 5/2020 | Donofrio ............... H04R 3/005 |
| 2020/0150934 A1 | 5/2020 | Webster et al. |
| 2020/0234697 A1 | 7/2020 | Webster et al. |
| 2020/0234699 A1 | 7/2020 | Webster et al. |

OTHER PUBLICATIONS

Webster, "Introducing Voicegram by Sayspring", Retrieved at: https://medium.com/vui-magazine/introducing-voicegram-by-sayspring-23273aa01af0, Feb. 6, 2018, 4 pages.

"Pre-Interview First Office Action", U.S. Appl. No. 16/189,063, dated May 11, 2020, 3 pages.

"First Action Interview Office Action", U.S. Appl. No. 16/189,063, dated Jun. 5, 2020, 3 pages.

"Final Office Action", U.S. Appl. No. 16/189,063, dated Jun. 19, 2020, 9 pages.

"Non-Final Office Action", U.S. Appl. No. 16/189,063, dated Sep. 4, 2020, 10 pages.

"Non-Final Office Action", U.S. Appl. No. 16/255,481, dated Aug. 27, 2020, 9 pages.

"Pre-Interview First Office Action", U.S. Appl. No. 16/255,481, dated Sep. 9, 2020, 3 pages.

\* cited by examiner

ASSEMBLED VOICE INTERACTION

BACKGROUND

Users are interacting with voice assistant devices to accomplish an increasing number of different voice-assisted tasks. Generally speaking, such voice assistant devices are configured with one or more microphones to receive voice commands from a user. Examples of dedicated voice assistant devices include the Amazon® Echo and Google® Home, which enable interactions with voice assistant platforms Amazon® Alexa and Google® Assistant, respectively. However, other devices, such as mobile phones, desktop computers, laptop computers, gaming systems, and so forth may also be configured as voice assistant devices capable of leveraging the functionality of a voice assistant platform. By way of example, an Apple® iPhone (a mobile phone) may serve as a voice assistant device, enabling a user to interact with the voice assistant platform Siri®.

Voice assistant devices are configured to respond to the user's voice commands in a variety of different ways, such as by outputting an audible (voice) response via one or more speakers, displaying visual content, providing other visual effects (e.g., indications via light emitting diodes (LEDs)), providing tactile feedback, and so forth. Moreover, the voice assistant platform may cause other devices, e.g., a thermostat, speakers, lights, and so on, to respond to the user's voice command. A few examples of responses for home appliances include changing a temperature of a thermostat to adjust a house's temperature, beginning to play music from a music service over speakers, turning certain lights in the house on or off, and so forth.

In many cases, users and companies would like to generate a high-quality recording of an interaction between a user and a voice assistant platform. Such a recording could be used to share a prototype of a voice-assisted project, showcase a finished project on website or portfolio page, or used as part of a user tutorial for interacting with a voice assistant platform. However, conventional tools are unable to capture a reliable and professional-quality recording of interactions with a voice assistant platform.

SUMMARY

To overcome these problems, assembled voice interaction techniques are leveraged in a digital medium environment. A voice interaction assembly system records a real-life interaction with the voice assistant platform during which a user speaks to the voice assistant platform and hears response audio back from the voice assistant platform. During the voice interaction, user portions and voice assistant portions of a voice interaction with a voice assistant platform are received and stored in a sequential order. The user portions of the voice interaction, for example, may correspond to audio data or text data indicative of speech (e.g., voice commands) included as part of a request to the voice assistant platform. In contrast, the voice assistant portions of the voice interaction may correspond to output content returned by the voice assistant platform for output as part of a response to the request. An assembled voice interaction file is assembled by interleaving the stored user portions of the voice interaction with the stored voice assistant portions of the voice interaction based on the sequential order.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

DETAILED DESCRIPTION

Overview

Users are interacting with voice assistant devices to accomplish an increasing number of different voice-assisted tasks. In many cases, users and companies would like to generate a high-quality "recording" of an interaction between a user and a voice assistant platform such as Amazon® Alexa or Google® Assistant. Such a recording could be used to share a prototype of a voice-assisted project, showcase a finished project on website or portfolio page, or used as part of a user tutorial for interacting with a voice assistant platform. However, conventional tools are unable to capture a reliable and professional-quality recording of interactions with a voice assistant platform. Currently, the best solution is to record an actual video of a user speaking to a voice assistant device using a video camera, in which case the captured video would include audio of the user's voice and audio outputted from the voice assistant device. Doing so is cumbersome for the user and the resulting recording is of low quality and unsuitable for sharing due to background noises, microphone positioning, variances in audio levels between the user and the voice assistant platform, and so forth. Additionally, a recording generated in this conventional manner is difficult to edit in post-production and limits the ability to show user interactions with the voice assistant platform other than voice, such as the user interacting with a user interface provided by the voice assistant platform during the voice interaction.

To overcome these problems, assembled voice interaction techniques are leveraged in a digital medium environment. A voice interaction assembly system records a real-life interaction with the voice assistant platform during which a user speaks to the voice assistant platform and hears response audio back from the voice assistant platform. During the voice interaction, the voice interaction assembly system "records" voice interaction data that is exchanged between the user and a voice assistant platform, and then assembles the voice interaction data to generate an assembled voice interaction file. Thus, unlike conventional systems which may record a conversation between a user and a voice assistant platform using a microphone and/or video camera, the assembled voice interaction file described herein is generated based on the actual voice interaction data exchanged between a user device that captures interactions by the user (e.g., voice commands) and the voice assistant platform which provides output content (e.g., based on the voice commands) for output at the user device.

To generate the assembled voice interaction file, the voice interaction assembly system receives both user portions of the voice interaction with the voice assistant platform and voice assistant portions of the voice interaction with the voice assistant platform. The user portions of the voice interaction, for example, may correspond to audio data or text data indicative of speech (e.g., voice commands) included as part of a request to the voice assistant platform. In contrast, the voice assistant portions of the voice interaction may correspond to output content returned by the voice assistant platform for output as part of a response to the request. In some cases, the output content is configured as data for audible output by the voice assistant device, e.g., audible speech. Additionally or alternately, the output content may be configured as data for display. In response to a voice command such as "what's the weather," for instance, the output content may be a graphical user interface having a summary of upcoming weather and configured for output via a display of the voice assistant device or another device. Similarly, the user portions of the voice interaction may include user interactions with elements displayed by the voice assistant platform (e.g., clicks, taps, or user-entered text) on a user interface displayed by the voice assistant platform.

During the voice interaction, the voice interaction assembly system stores the user portions of the voice interaction and the voice assistant portions of the voice interaction in a sequential order corresponding to the order in which the data is exchanged. In effect, therefore, the voice interaction assembly system "intercepts" the data exchanged between the user and the voice assistant platform during the voice interaction, and maintains a copy of the exchanged data in the sequential order. To do so, the voice interaction assembly system may generate a manifest file that references the stored user portions and voice assistant portions of the voice interaction in the sequential order in which the data was exchanged. To maintain the sequential order, a time stamp is associated with each user portion and voice assistant portion of the voice interaction data indicating the time of exchange. Then, the voice interaction assembly system causes assembly of an assembled voice interaction file by interleaving the stored user portions of the voice interaction with the stored voice assistant portions of the voice interaction based on the sequential order of the manifest file. Thus, as compared to conventional solutions which record a conversation between a user and a voice assistant from a single source (e.g., a single video camera), the voice interaction assembly system assembles data from multiple different sources in sequential order to form a high quality voice interaction file which can be exported or shared as a video or audio file.

Moreover, assembling the voice interaction file using the exchanged data enables the voice interaction assembly system to perform various post-recording editing functions on the exchanged data prior to assembling the voice interaction file. Such editing functions for example may be used to generate a recording which better simulates a real-world voice interaction with a voice assistant platform, such as by adding delays or breaks between different data types, normalizing of audio levels, or adding or removing background noise or other audio artifacts. Additionally, the voice interaction assembly system provides a user interface to enable the user to customize the appearance of the assembled voice interaction file, such as by including custom background artwork, captions, branding, watermarks, and so forth.

In the following discussion, an example environment is first described that may employ the techniques described herein. Example implementation details and procedures are then described which may be performed in the example environment as well as other environments. Consequently, performance of the example procedures is not limited to the example environment and the example environment is not limited to performance of the example procedures.

Example Environment

Figure 1:
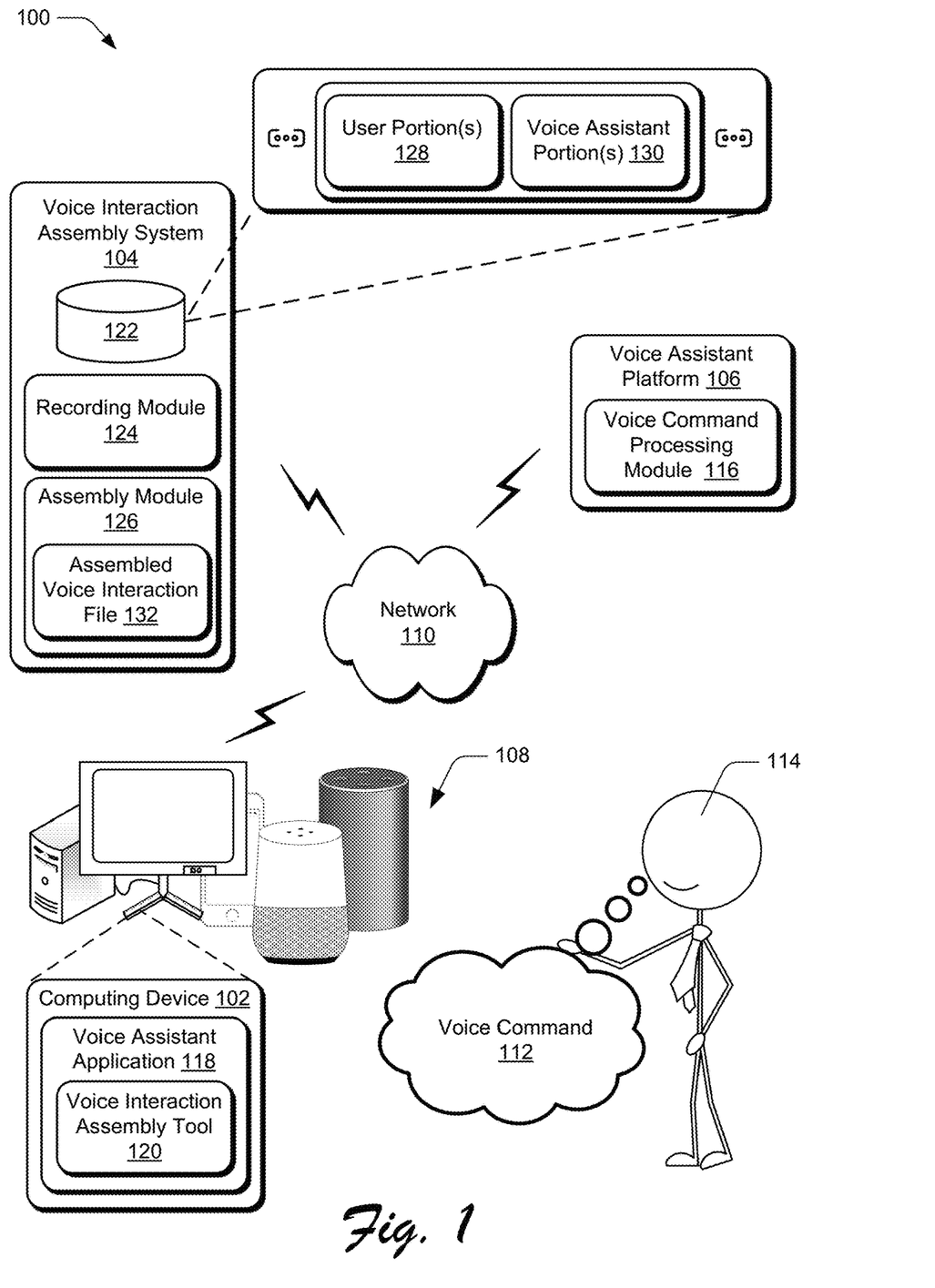
FIG. 1 is an illustration of an environment in an example implementation that is operable to employ techniques described herein.

FIG. 1 is an illustration of an environment 100 in an example implementation that is operable to employ a voice interaction development tool as described herein. The illustrated environment 100 includes computing device 102, voice interaction assembly system 104, voice assistant platform 106, and various voice assistant devices 108 that are communicatively coupled, one to another, via a network 110.

Devices that are usable to implement the computing device 102, voice interaction assembly system 104, and voice assistant platform 106 may be configured in a variety of ways. These devices, for instance, may be configured as a desktop computer, a laptop computer, a mobile device (e.g., assuming a handheld configuration such as a tablet or mobile phone), and so forth. Thus, the device may range from full resource devices with substantial memory and processor resources (e.g., personal computers, game consoles) to a low-resource device with limited memory and/or processing resources (e.g., mobile devices). Additionally, a device may be representative of a plurality of different devices, such as multiple servers utilized by a business to perform operations "over the cloud" as further described in relation to FIG. 8.

The voice assistant devices 108 may also be configured in a variety of ways. Generally speaking, the voice assistant devices 108 are configured with one or more microphones to receive voice commands 112 from a user 114. Examples of dedicated voice assistant device 108 include the Amazon® Echo and Google® Home, which enable interactions with voice assistant platforms Amazon® Alexa and Google® Assistant, respectively. Other devices, such as mobile phones, desktop computers, laptop computers, gaming systems, and so forth may also be configured as voice assistant devices 108 capable of leveraging the functionality of a voice assistant platform. By way of example, an Apple® iPhone (a mobile phone) may serve as a voice assistant device 108, enabling a user 114 to interact with the voice assistant platform Siri®. To this end, the voice assistant devices 108 can be configured to receive user input through interfaces (e.g., touch, camera, etc.) in addition to receiving voice commands 112.

In any case, these voice assistant devices 108 interact with their respective voice assistant platform 106 to respond to the voice commands 112. The voice assistant platform 106 is illustrated having voice command processing module 116. The voice command processing module 116 represents functionality to receive a request initiated by the voice command 112, determine how to respond to the request, and provide a response to the voice assistant device 108 or any other devices that may be affected by the voice command 112, such as appliances within a connected home, service provider devices providing one or more respective services (e.g., facilitating delivery of goods by an e-commerce platform), and so on. Accordingly, the voice assistant devices 108 may be configured to respond to the user 114's voice commands in myriad ways, such as by outputting an audible (voice) response via one or more speakers, displaying visual content, providing other visual effects (e.g., indications via light emitting diodes (LEDs)), providing tactile feedback, and so forth. Moreover, the voice assistant platform 106 may cause other devices, e.g., a thermostat, speakers, lights, and so on, to respond to the user 114's voice command 112. A few examples of responses for home appliances include changing a temperature of a thermostat to adjust a house's temperature, beginning to play music from a music service over speakers, turning certain lights in the house on or off, and so forth. The voice commands 112 may be leveraged in a variety of settings (e.g., home, work, etc.) to initiate responses via one or more devices, including, but not limited to the voice assistant device 108.

In some cases, the functionality of a voice assistant device 108 may be provided on computing device 102 as a voice assistant application 118. The voice assistant application 118 may be implemented as a standalone application, or as service accessible through a web browser or application. In this scenario, the voice assistant application 118 is built on top of the voice assistant platform 106 which enables the user interaction with the voice assistant application 118 as if the computing device 102 were a dedicated voice assistant device 108.

In accordance with the described techniques, a voice interaction assembly tool 120 may leverage the functionality of the voice assistant application 118 in order to facilitate recording of voice interactions with the voice assistant platform 106 via the voice assistant application 118 or a dedicated voice assistant device 108. By way of example, the voice interaction assembly tool 120 can facilitate recording of a voice assisted interaction by providing a recording user interface for user selection to initiate and end the recording of the voice interaction, edit the recording, and so forth.

As part of facilitating recording of voice-assisted interactions, the voice interaction assembly tool 120 leverages functionality of the voice interaction assembly system 104. In the illustrated environment 100, the voice interaction assembly system 104 is depicted with a storage 122, a recording module 124, and an assembly module 126. Although illustrated with these particular components, it should be appreciated that the voice interaction assembly system 104 may include or have access to (e.g., via a cloud-computing service) more, fewer, and different components to provide the functionality described herein without departing from the spirit or scope thereof. Moreover, while the recording module 124 and the assembly module 126 are illustrated as being implemented at the voice interaction assembly system 104 which is remote from computing device 102 and accessible via network 110, the recording module 124 and/or the assembly module 126 may alternately be implemented at the computing device 102 (e.g., as part of the voice interaction assembly tool 120) or at a dedicated voice assistant device 108.

Broadly speaking, the voice interaction assembly system 104 and the voice interaction assembly tool 120 represent functionality to store voice interaction data that is exchanged between the user 114 and voice assistant platform 106 as part of a voice interaction, and then assemble the voice interaction data to generate an assembled voice interaction file. The functionality of the recording module 124 and the assembly module 126 is effective in concert with the voice interaction assembly tool 120 and a voice assistant platform 106 to facilitate recording of a voice interaction with the voice assistant platform 106. To begin, the voice assistant application 118 causes display of a user interface which enables the user to initiate a recording of a voice interaction with the voice assistant platform 106. In real-time, as the user 114 speaks the voice command 112 to voice assistant application 118, the voice assistant application generates request data which includes the voice command 112 captured by a microphone of the computing device 102 or dedicated voice assistant device 108. The request data, for instance, may correspond to an audio file (e.g., mp3 file) of the spoken voice command 112. The request data including the spoken voice command 112 is then provided to the voice assistant platform 106. The voice command processing module 116 of the voice assistant platform 106 processes the request data to identify corresponding response data which is returned for output. The response data, for example, may cause the computing device 102 or the dedicated voice assistant device 108 to output response content, such as by outputting audible content, visual content, or some combination thereof. Based on the voice assistant platform 106's response, the user 114 may speak an additional voice command., and the voice assistant platform 106 may respond to this additional command by outputting additional response content. This process may then continue back and forth between the user speaking a voice command which is provided to the voice assistant platform 106 as a request, and the voice assistant platform 106 providing a response to the user by causing output of audible or visual content.

During this voice interaction with the voice assistant platform, the recording module 124 receives the response data (e.g., the voice command) communicated to the voice assistant platform 106, as well as the response data returned by the voice assistant platform 106 for output, and stores this data in the storage 122 as user portions 128 and voice assistant portions 130, respectively. The stored user portions 128 and voice assistant portions 130 of the voice interaction, for example, may include audio file (e.g., mp3 files), metadata, headers, and so forth. In addition, a session identifier and timestamp may be stored along with the user portions 128 and the voice assistant portions 130 in order to maintain a sequential order in which the data was exchanged. In effect, therefore, the recording module 124 "intercepts" the data exchanged between the user and the voice assistant platform 106 during the voice interaction, and maintains a copy of the exchanged data in sequential order in the storage 122. While illustrated as being remote from computing device 102, in some cases the recording module 124 and the storage 122 may be implemented locally at computing device 102.

In response to a request to end the recording, e.g., via user input to the user interface provided by the voice assistant application 118, the assembly module 126 causes assembly of an assembled voice interaction file 132 by interleaving the stored user portions 128 of the voice interaction with the stored voice assistant portions 130 of the voice interaction based on the sequential in which the data was exchanged. Thus, as compared to conventional solutions which record a conversation between a user and a voice assistant from a single source (e.g., a single video camera), the voice interaction assembly system 104 assembles data from multiple different sources (e.g., a microphone that captures the voice command 112 as well as the voice assistant platform 106 which provides the response data) in sequential order to form a high quality assembled voice interaction file 132 which can be exported or shared as a video or audio file.

Notably, the voice interaction assembly system 104 includes functionality to interact with any of a plurality of voice assistant platforms, including the voice assistant platform 106. Indeed, each voice assistant platform may require data formatted in different ways to provide voice assistance functionality, such as with different headers, different payloads, different metadata associated with requests and responses, and so forth. To this end, the voice interaction assembly system 104 is capable of identifying which of the plurality of voice assistant platforms is being leveraged, and thus process the voice interaction data to generate the assembled voice interaction file 132 based on the respective format of the identified platform.

Having considered an example environment, consider now a discussion of some example details of the techniques for assembled voice interaction in a digital medium environment in accordance with one or more implementations.

Voice Interaction Assembly

Figure 2:
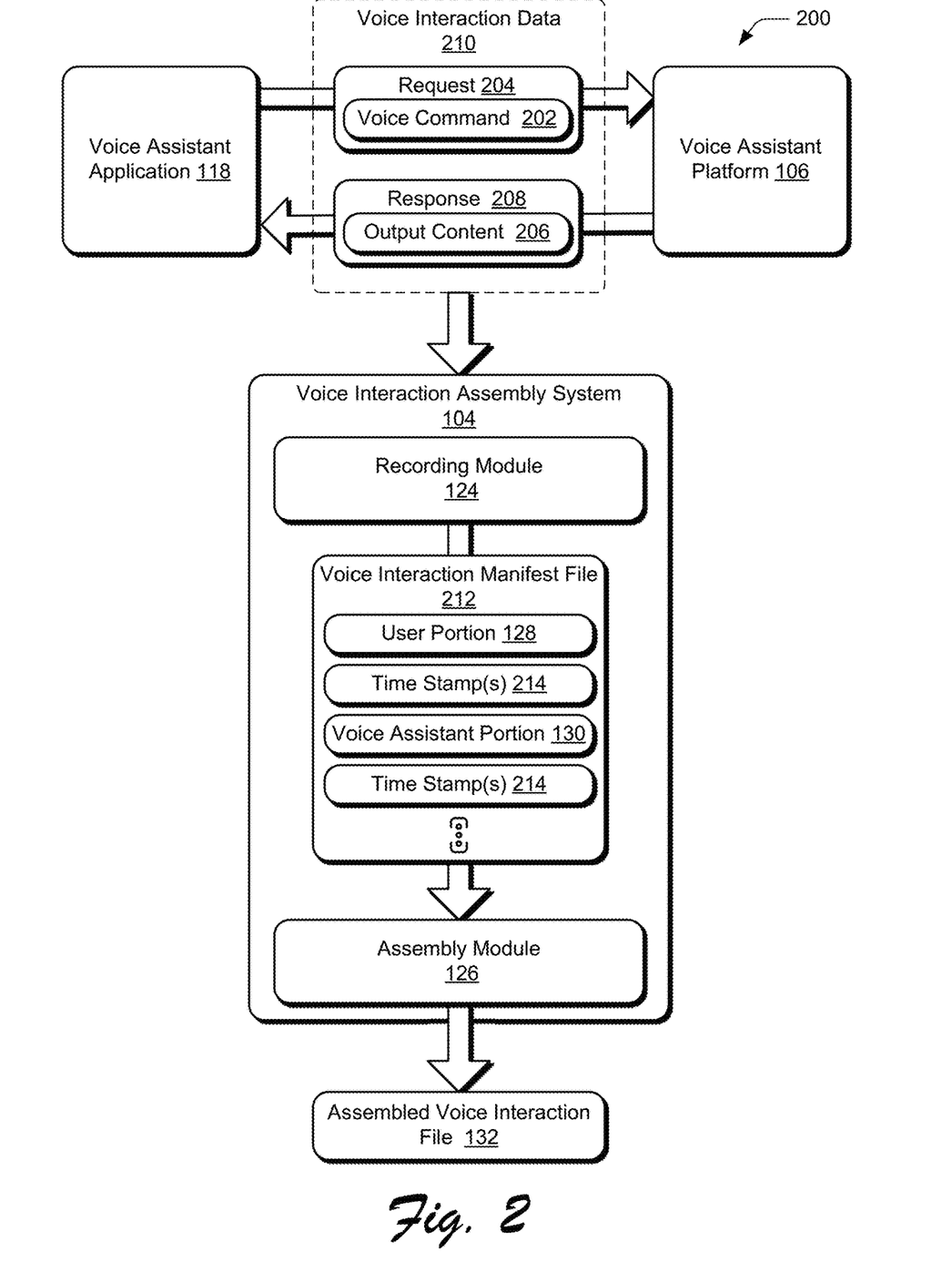
FIG. 2 depicts an example implementation in which the voice interaction assembly system of FIG. 1 facilitates assembly of an assembled voice interaction file based on interactions with a voice assistant platform.

FIG. 2 depicts an example implementation 200 in which the voice interaction assembly system of FIG. 1 facilitates assembly of an assembled voice interaction file based on interactions with a voice assistant platform. The illustrated example 200 includes from FIG. 1 the voice interaction assembly system 104, the voice assistant platform 106, and the voice assistant application 118.

In this example, the voice assistant application 118 obtains a voice command 202, such as when the user 114 speaks the corresponding voice command 112 to the computing device 102 or a dedicated voice assistant device 108. The voice command 202 may be configured as audio data or text data indicative of the speech of the user to the voice assistant application 118. The voice assistant application 118 is also shown as communicating the voice command 202 (e.g., as an audio file captured by a microphone) to the voice assistant platform 106 as part of a request 204. In this way, the request 204 is initiated via the voice command 202 to the voice assistant platform 106. As described throughout, the request 204 may also include user interaction data indicative of interactions other than voice commands, such as user gestures or other input provided to a user interface provided by the voice assistant application 118.

The voice assistant platform 106 receives the request 204 and processes the received request 204 to extract or otherwise determine the corresponding voice command 202. Next, the voice assistant platform 106 identifies output content 206 that matches the voice command 202 of the request 204. In contrast to the voice command 202, the output content 206 represents the output of the computing device 102, the voice assistant device 108, or other appropriate device (e.g., connected appliances) in response to receipt of the voice command 202. In one or more implementations, the output content 206 is configured as data for audible output, e.g., audible speech. Additionally or alternately, the output content 206 may be configured as data for display by the computing device 102, voice assistant device 108, or another device. In response to a voice command such as "what's the weather," for instance, the output content 206 may be a graphical user interface having a summary of upcoming weather and configured for output via a display of the computing device 102. Indeed, the output content 206 may be configured in a variety of ways as responding to a particular voice command 202 without departing from the spirit or scope of the described techniques.

In accordance with the described techniques, the voice assistant platform 106 generates a response 208 to the request 204. The response 208 includes the output content 206 associated with the voice command 202. The response 208 containing the output content 206 is then communicated from the voice assistant platform 106 to the voice assistant application 118 for output. Collectively, requests 204 and corresponding responses 208 are depicted as voice interaction data 210.

As the voice assistant application 118 receives the voice commands 202 and outputs the output content 206, the recording module 124 of the voice interaction assembly system 104 stores both the voice commands 202 and the output content 206 of the voice interaction data 210 in the storage 122. As part of the storage process, the recording module 124 generates a voice interaction manifest file 212 which references user portions 128 of the voice interactions (e.g., voice commands 202) as well as voice assistant portions 130 of the voice interactions (e.g., output content 206) in a sequential order. To maintain the sequential order in which the voice interaction data 210 is exchanged between the voice assistant application 118 and the voice assistant platform 106, the recording module 124 includes time stamps 214 indicative of the time at which the corresponding data was exchanged.

In response to a request to end the recording, e.g., via user input to the user interface provided by the voice assistant application 118, the assembly module 126 causes assembly of an assembled voice interaction file 132 by interleaving the stored user portions 128 of the voice interaction with the stored voice assistant portions of the voice interaction in sequential order based on corresponding time stamps 214 of the voice interaction manifest file 212.

Figure 3:
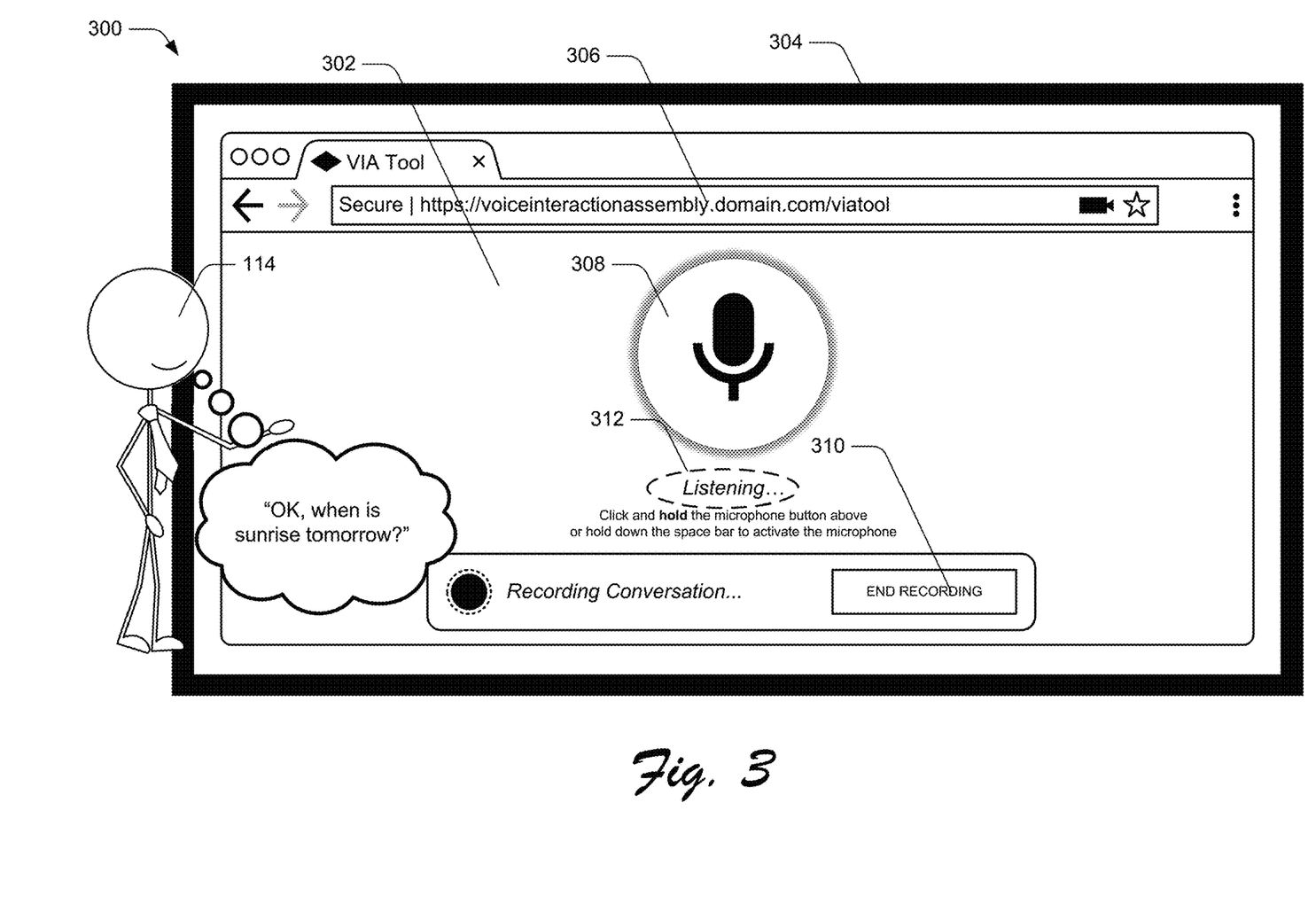
FIG. 3 depicts an example user interface of a voice interaction assembly tool via which recording of a voice interaction for assembly can be initiated and ended.

FIG. 3 depicts an example 300 of a user interface of a voice interaction assembly tool via which recording of a voice interaction for assembly can be initiated and ended.

The illustrated example 300 includes a voice interaction assembly interface 302 displayed by voice interaction assembly tool 120 via a display device 304. In this example 300, the voice interaction assembly interface 302 is shown displayed within an interface of browser application 306. It should be appreciated, however, that presentation of the voice interaction assembly interface 302 is not limited to presentation via browsers. Instead, the voice interaction assembly interface 302 may be presented as part of or within a variety of interfaces—such as part of a native application or a mobile application—without departing from the spirit or scope of the described techniques.

As illustrated, the voice interaction assembly interface 302 includes recording initiation instrumentality 308 and recording ending instrumentality 310. In accordance with the described techniques, the recording initiation instrumentality 308 represents functionality of the voice interaction assembly tool 120 to receive user input to initiate recording of a voice interaction between the user 114 and one of the voice assistant devices 108 or computing device 102 configured with voice assistant application 118. It follows that the recording ending instrumentality 310 represents functionality of the voice interaction assembly tool 120 to receive user input to end recording of the voice interaction.

In response to a user input received via the recording initiation instrumentality 308, for instance, the recording module 124 intercepts various inputs provided by the user 114 (e.g., of the user 114's voice to produce the user portion 128) and intercepts responses of the voice assistant platform 106 (e.g., the voice assistant portion 130). In response to a user input received via the recording ending instrumentality 310, though, the recording module ceases intercepting the user 114's requests and the voice assistant platform 106's responses. As discussed above, the assembly module 126 then uses this information to produce the assembled voice interaction file.

In addition to the recording initiation instrumentality 308 and recording ending instrumentality 310, the voice interaction assembly interface 302 also includes voice assistant status 312. The voice assistant status 312 indicates in real time a current status of the voice assistant platform 106 during the voice interaction. In the illustrated example 300, the user 114 is depicted speaking. Accordingly, the voice assistant status 312 comprises the text string 'Listening . . . ' indicating that the recording module 124 is recording the user 114's speech (e.g., is receiving speech data of the user 114 as input). The voice interaction assembly interface 302 may provide a variety of different types of information about recording a voice interaction in the spirit or scope of the described techniques, such as information indicating that the voice interaction is currently being recorded or not, information about other ways to initiate and end the recording, information about whether the voice assistant platform 106 is receiving input from the user 114 ("Listening") or outputting content ("Talking"), and so forth. In the context of the voice assistant platform 106 providing output during the voice interaction, consider FIG. 4.

Figure 4:
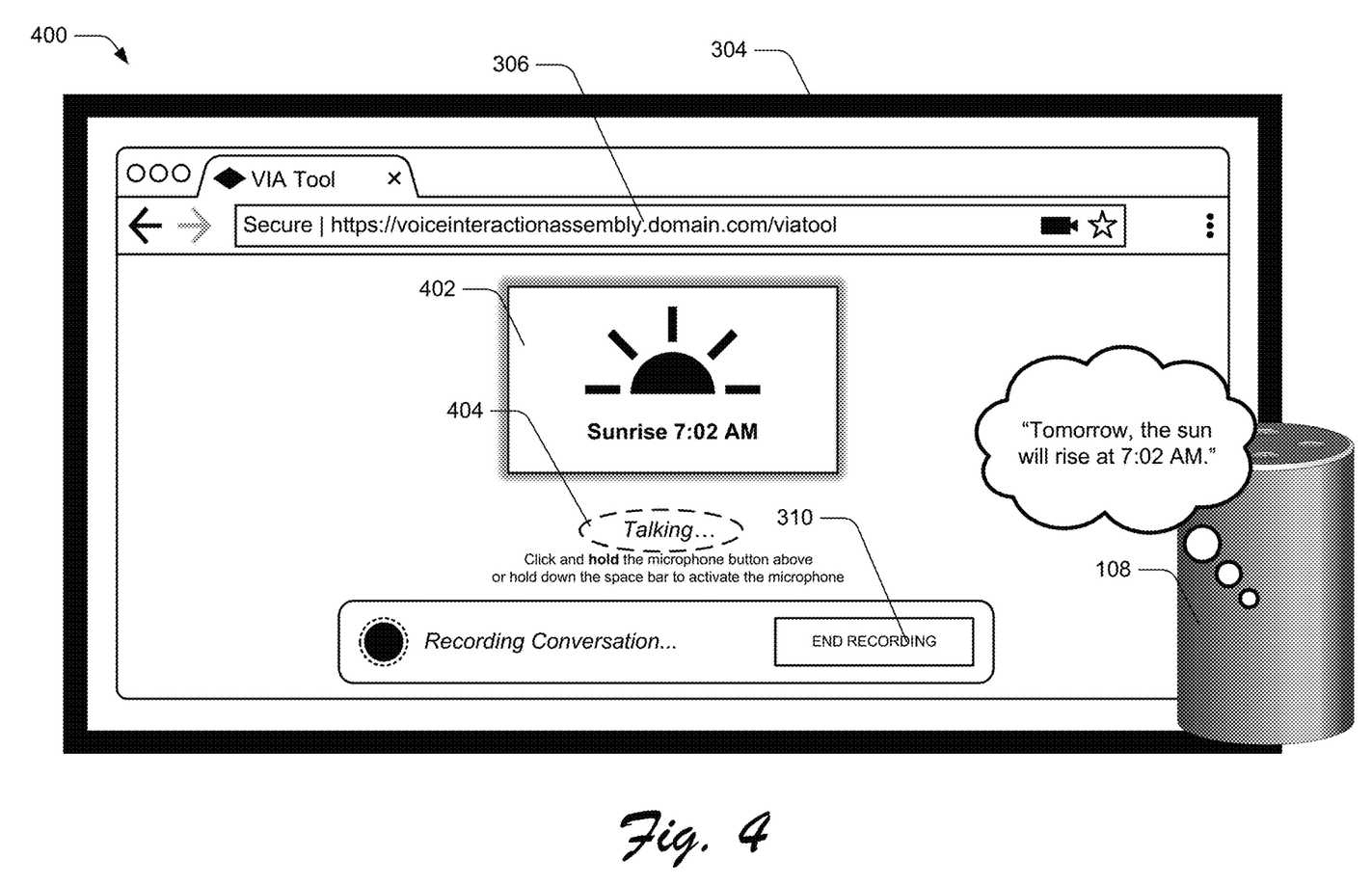
FIG. 4 depicts another example of the user interface in which graphical indications are displayed that indicate output of content by a voice assistant during the voice interaction.

FIG. 4 depicts another example 400 of the user interface in which graphical indications are displayed that indicate output of content by a voice assistant platform during the voice interaction.

In this example 400, the recording initiation instrumentality 308 depicted in FIG. 3 is replaced with voice-assistant visual output content 402. This visual output content 402 represents digital content which the voice assistant device 108 may display as part of the voice interaction, e.g., when the voice assistant device 108 or computing device 102 is configured to include a display device or is otherwise communicably coupled to a display device. This replacement represents a scenario in which the voice interaction assembly interface 302 is modified in real time based on the voice interaction being recorded to indicate information about the voice interaction and information output in connection with the voice interaction. In this case, the replacement of the recording initiation instrumentality 308 with the visual output content 402 indicates that the voice assistant platform 106 is outputting content for display (e.g., a visual image of a sunrise) via voice assistant device 108 or computing device 102. In this illustrated example 400, the voice assistant device 108 is depicted outputting both audible voice content (e.g., "Tomorrow, the sun will rise at 7:02 AM) via a speaker along with the visual output content 402 for display.

The voice interaction assembly interface 302 also includes a different voice assistant status 404 from the voice assistant status 312 depicted in FIG. 3. In contrast to the example depicted in FIG. 3, the illustrated example 400 depicts the voice assistant device 108 outputting audible voice. Accordingly, the different voice assistant status 404 comprises the text string 'Talking . . . ' indicating that the voice assistant device 108 is outputting audible voice.

Although the voice interaction assembly interface 302 is depicted as being modified during the voice interaction with these various differences—between when the user 114 is speaking and when the voice assistant device 108 is outputting content—the voice interaction assembly interface 302 may be visually modified in a variety of ways in real time during a voice interaction without departing from the spirit or scope of the described techniques.

Figure 5:
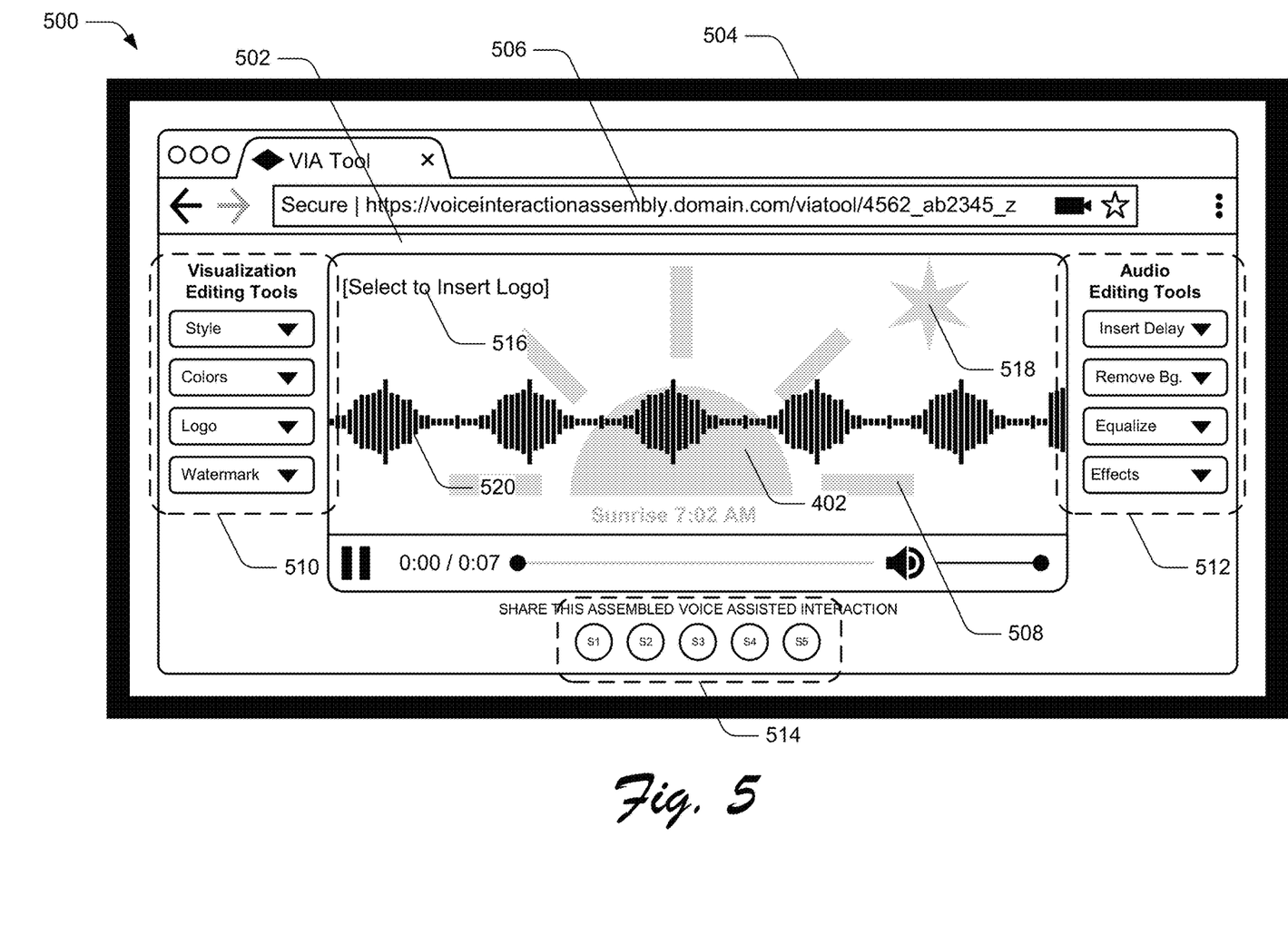
FIG. 5 depicts an example of a user interface in which playback of an assembled voice interaction can be initiated and via which characteristics of a playback interface and characteristics of the voice interaction as played back can be modified.

FIG. 5 depicts an example 500 of a user interface in which playback of an assembled voice interaction file can be initiated and via which characteristics of a playback interface and characteristics of the voice interaction as played back can be modified.

The illustrated example 500 includes a playback editing interface 502 displayed via display device 504, which may correspond to the display device 304 in one or more implementations. In this example 500, the playback editing interface 502 is also shown displayed within an interface of a browser application 506 but, like the voice interaction assembly interface 302, is not limited to presentation via browsers.

As illustrated, the playback editing interface 502 includes sample playback interface 508, visualization editing tools 510, audio editing tools 512, and assembled interaction sharing instrumentalities 514. The sample playback interface 508 is an editable interface, which can be modified based on user input received via the playback editing interface 502 and which indicates how a playback interface configured for propagation to one or more users will be presented to them. Generally speaking, the configured playback interface allows the one or more users to which it is propagated simply to playback a respective assembled voice interaction file 132. This playback interface also may present visualizations (e.g., of an audio signal) corresponding to the playback. In this example, the playback interface of the voice interaction file 132 further includes the visual content 402 (e.g., a visual image of a sunrise) which was output by the voice assistant platform for display during the voice interaction. Thus, the assembled voice interaction file 132 includes both audible output content as well as visual output content that is output by the voice assistant platform during the voice interaction. In one or more implementations, the playback interface propagated to the one or more users may also include playback controls that allow receiving users to control playback, such as by selecting to initiate the playback (a 'play' button), pause the playback, rewind the playback, fast forward the playback, stop the playback, and so on. In contrast to the sample playback interface 508, the propagated playback interface is not editable, or at least is not editable with the editing tools of the playback editing interface 502.

In the illustrated example 500, the sample playback interface 508 includes a logo insertion instrumentality 516, a watermark 518, and an audio-signal waveform 520. In one or more implementations, each of these elements of the sample playback interface 508 is modifiable via the playback editing interface 502, such as by using the visualization editing tools 510. As illustrated, the visualization editing tools 510 include instrumentalities for editing a style of the sample playback interface 508, colors of the interface, a logo applied to the interface, and a watermark applied to the interface. Style may refer to a variety of characteristics of the sample playback interface 508, such as position of interface elements (e.g., playback controls, logo, etc.), sizes of interface elements, fonts, inclusion of interface elements (e.g., whether the sample playback interface 508 includes the audio-signal waveform 520, the watermark 518, and other elements or not), and so forth. The visualization editing tools 510 may include instrumentalities for modifying different visual aspects of a playback interface without departing from the spirit or scope of the techniques described herein.

In contrast to the visualization editing tools 510, the audio editing tools 512 enable a user to modify various aspects of the corresponding assembled voice interaction. By way of example, the audio editing tools 512 may enable a user to add or modify a delay between user portions and voice-assistant portions of the assembled voice interaction, remove background noise, equalize a volume of the user portions and voice-assistant portions of the assembled voice interaction, apply audio effects to the voice interaction (e.g., reverb effect, chorus effect, chamber effect, etc.), and so forth. In the illustrated example 500, the audio editing tools 512 are depicted including instrumentalities for inserting delays, removing background noise, equalizing volume, and applying effects. In implementation, however, the playback editing interface 502 may include instrumentalities for editing different aspects of the corresponding assembled voice interaction within the spirit and the scope of the described techniques.

Having discussed example details of the techniques for assembled voice interaction, consider now some example procedures to illustrate additional aspects of the techniques.

Example Procedures

This section describes example procedures for assembled voice interaction techniques in one or more implementations. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks. In at least some implementations the procedures are performed by a suitably configured device, such as the computing device 102 that makes use of the voice interaction assembly tool 120 and the voice interaction assembly system 104 that makes use of the recording module 124 and the assembly module 126.

Figure 6:
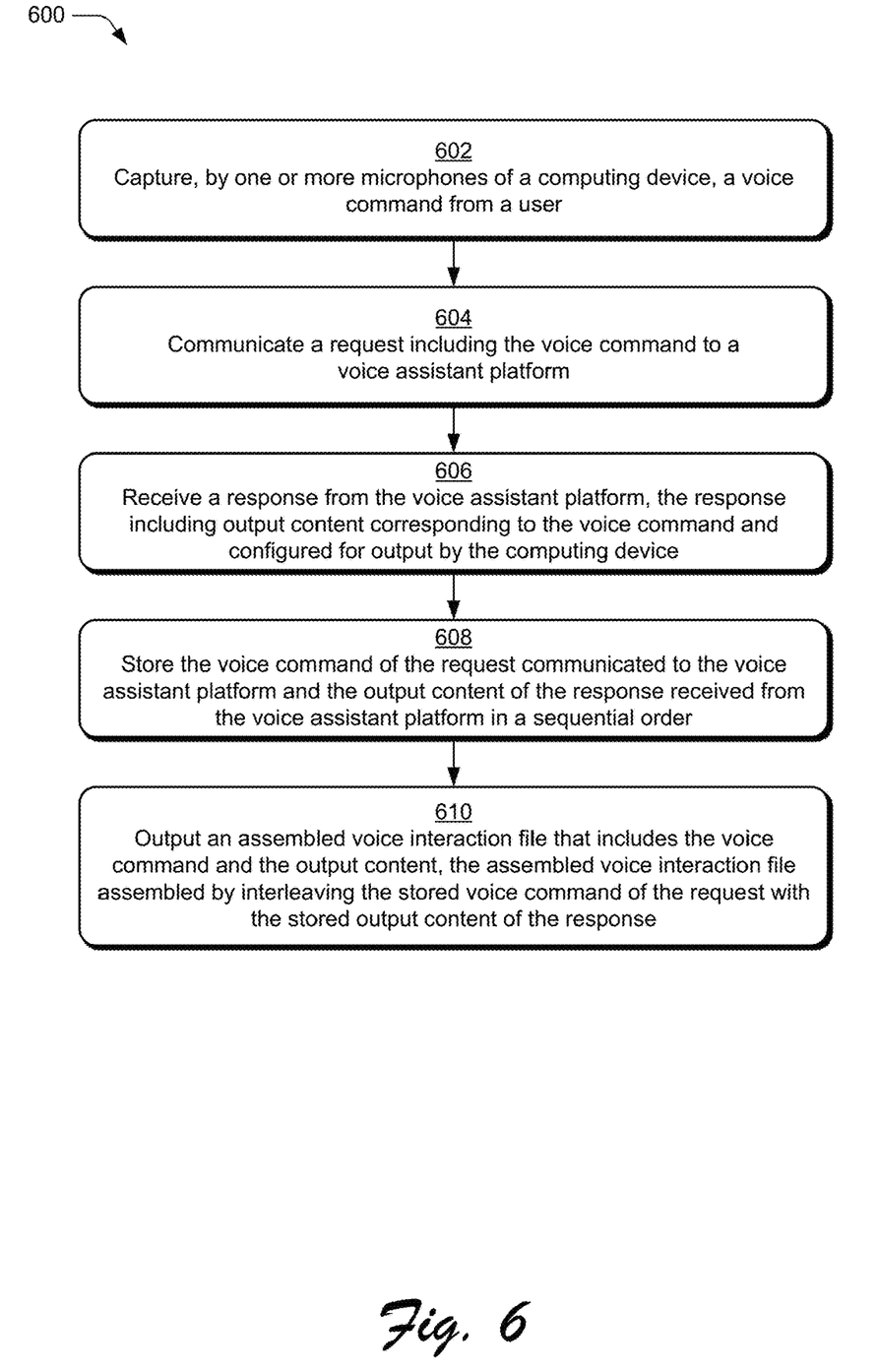
FIG. 6 depicts an example procedure of assembled voice interaction in accordance with one or more implementations.

FIG. 6 depicts an example procedure 600 of assembled voice interaction in accordance with one or more implementations.

A voice command from a user is captured by one or more microphones of a computing device (block 602). By way of example, one or more microphones of computing device 102 or voice assistant device 108 captures a voice command 112 from a user 114 when the user speaks the voice command.

A request including the voice command is communicated to a voice assistant platform (block 604). By way of example, a voice assistant application 118 communicates a request 204 including the voice command 202 to a voice assistant platform 106.

A response from the voice assistant platform is received (block 606). In accordance with the principles discussed herein, the response includes output content corresponding to the voice command and configured for output by the computing device. By way of example, the voice assistant application 118 receives a response 208, containing output content 206, from voice assistant platform 106.

The voice command of the request communicated to the voice assistant platform and the output content of the response received from the voice assistant platform is stored in a sequential order (block 608). By way of example, recording module 124 (implemented at or remote from computing device 102) stores the voice command of the request as a user portion 128 of the voice interaction in a storage 122, and stores the output content 206 of the response 208 as a voice assistant portion 130 of the voice interaction in the storage 122. As discussed throughout, the storage may be implemented at computing device 102 or remote from computing device 102 (e.g., as a cloud storage).

An assembled voice interaction file that includes the voice command and the output content is output (block 610). In accordance with the principles discussed herein, the assembled voice interaction file is assembled by interleaving the stored voice command of the request with the stored output content of the response. By way of example, the assembly module 126 assembles the assembled voice interaction file 132 by interleaving the stored voice command 202 of the request 204 with the stored output content 206 of the response 208.

Figure 7:
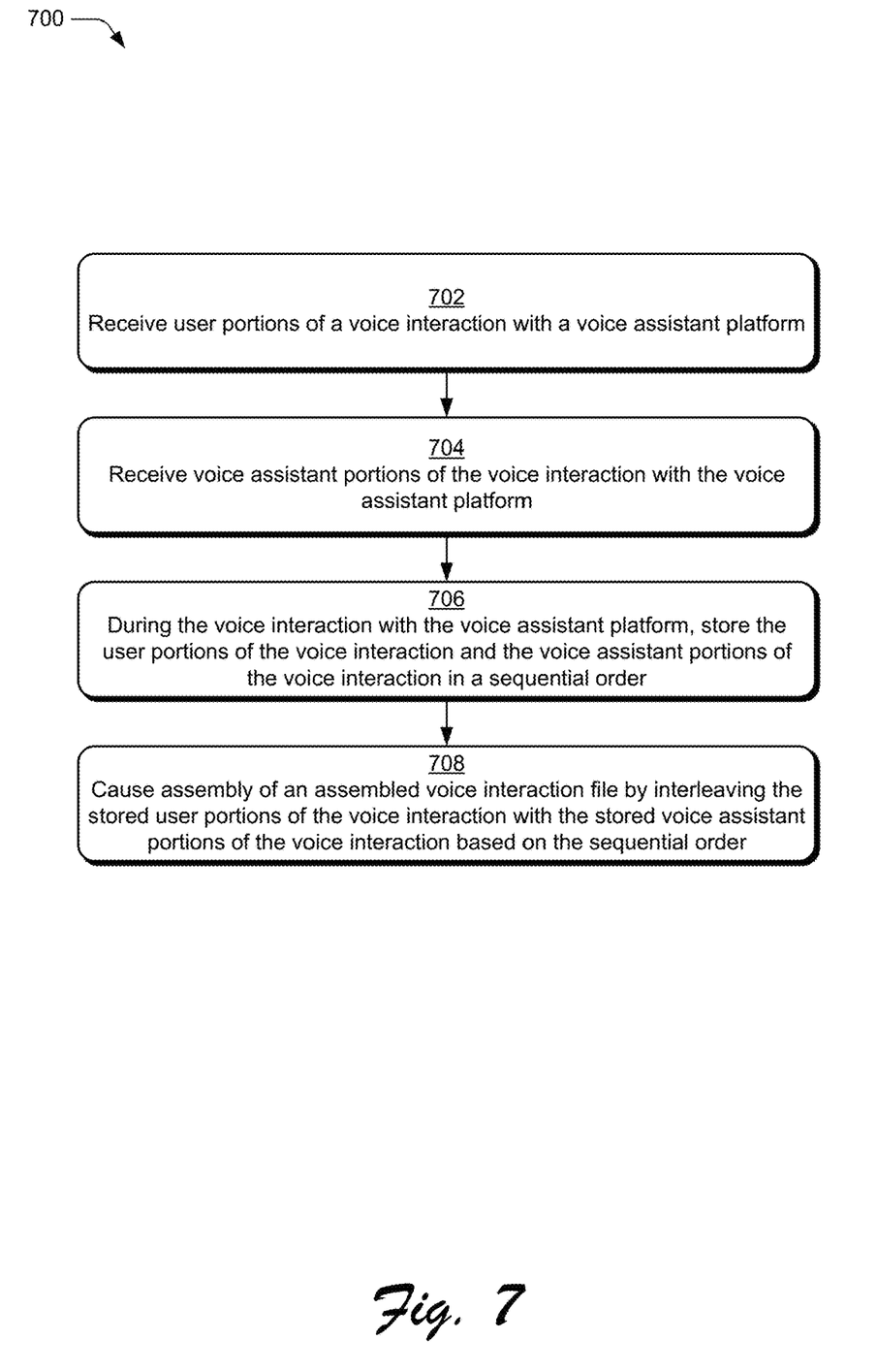
FIG. 7 depicts an additional example procedure of assembled voice interaction in accordance with one or more implementations.

FIG. 7 depicts an additional example procedure 700 of assembled voice interaction in accordance with one or more implementations.

User portions of a voice interaction with a voice assistant platform are received (block 702). By way of example, recording module 124 receives user portions 128 of a voice interaction with a voice assistant platform 106.

Voice assistant portions of the voice interaction with the voice assistant platform are received (block 704). By way of example, recording module 124 receives voice assistant portions 130 of the voice interaction with the voice assistant platform 106.

During the voice interaction with the voice assistant platform, the user portions of the voice interaction and the voice assistant portions of the voice interaction are stored in a sequential order (block 706). By way of example, during this voice interaction with the voice assistant platform, the recording module 124 receives the response data (e.g., the voice command) communicated to the voice assistant platform 106, as well as the response data returned by the voice assistant platform 106 for output, and stores this data in the storage 122 as user portions 128 and voice assistant portions 130, respectively. The stored user portions 128 and voice assistant portions 130 of the voice interaction, for example, may include audio file (e.g., mp3 files), metadata, headers, and so forth. In addition, a session identifier and timestamp may be stored along with the user portions 128 and the voice assistant portions 130 in order to maintain a sequential order in which the data was exchanged. In effect, therefore, the recording module 124 "intercepts" the data exchanged between the user and the voice assistant platform 106 during the voice interaction, and maintains a copy of the exchanged data in sequential order in the storage 122. While illustrated as being remote from computing device 102, in some cases the recording module 124 and the storage 122 may be implemented locally at computing device 102.

An assembled voice interaction file is assembled by interleaving the stored user portions of the voice interaction with the stored voice assistant portions of the voice interaction based on the sequential order (block 708). By way of example, in response to a request to end the recording, e.g., via user input to the user interface provided by the voice assistant application 118, the assembly module 126 causes assembly of an assembled voice interaction file 132 by interleaving the stored user portions 128 of the voice interaction with the stored voice assistant portions 130 of the voice interaction based on the sequential in which the data was exchanged. Thus, as compared to conventional solutions which record a conversation between a user and a voice assistant from a single source (e.g., a single video camera), the voice interaction assembly system 104 assembles data from multiple different sources (e.g., a microphone that captures the voice command 112 as well as the voice assistant platform 106 which provides the response data) in sequential order to form a high quality assembled voice interaction file 132 which can be exported or shared as a video or audio file.

Having described example procedures in accordance with one or more implementations, consider now an example system and device that can be utilized to implement the various techniques described herein.

Example System and Device

Figure 8:
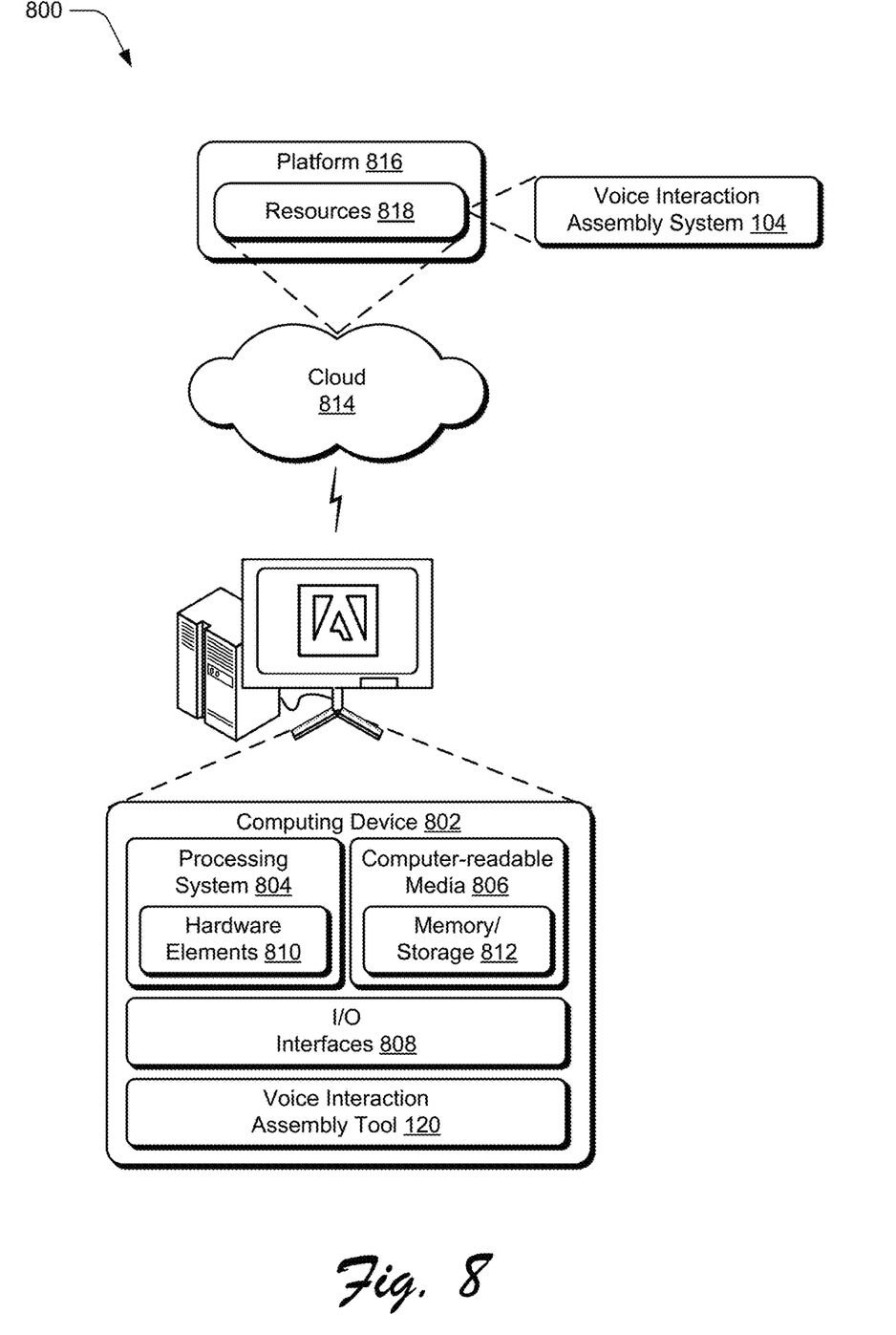
FIG. 8 illustrates an example system including various components of an example device that can be implemented as any type of computing device as described and/or utilized with reference to FIGS. 1-7 to implement embodiments of the techniques described herein.

FIG. 9 illustrates an example system generally at 800 that includes an example computing device 802 that is representative of one or more computing systems and/or devices that may implement the various techniques described herein. This is illustrated through inclusion of the voice interaction assembly system 104 and the voice interaction assembly tool 120. The computing device 802 may be, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interfaces 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware elements 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 806 is illustrated as including memory/storage 812. The memory/storage 812 represents memory/storage capacity associated with one or more computer-readable media. The memory/storage component 812 may include volatile media (such as random access memory (RAM)) and/or nonvolatile media (such as read only memory (ROM), Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of a module that is executable by the computing device 802 as software may be achieved at least partially in hardware, e.g., through use of computer-readable storage media and/or hardware elements 810 of the processing system 804. The instructions and/or functions may be executable/operable by one or more articles of manufacture (for example, one or more computing devices 802 and/or processing systems 804) to implement techniques, modules, and examples described herein.

The techniques described herein may be supported by various configurations of the computing device 802 and are not limited to the specific examples of the techniques described herein. This functionality may also be implemented all or in part through use of a distributed system, such as over a "cloud" 814 via a platform 816 as described below.

The cloud 814 includes and/or is representative of a platform 816 for resources 818. The platform 816 abstracts underlying functionality of hardware (e.g., servers) and software resources of the cloud 814. The resources 818 may include applications and/or data that can be utilized while computer processing is executed on servers that are remote from the computing device 802. Resources 818 can also include services provided over the Internet and/or through a subscriber network, such as a cellular or Wi-Fi network.

The platform 816 may abstract resources and functions to connect the computing device 802 with other computing devices. The platform 816 may also serve to abstract scaling of resources to provide a corresponding level of scale to encountered demand for the resources 818 that are implemented via the platform 816. Accordingly, in an interconnected device embodiment, implementation of functionality described herein may be distributed throughout the system 800. For example, the functionality may be implemented in part on the computing device 802 as well as via the platform 816 that abstracts the functionality of the cloud 814.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to record a voice interaction with a voice assistant platform, a method implemented by at least one computing device, the method comprising:
    receiving, by the at least one computing device, user portions of the voice interaction with the voice assistant platform;
    receiving, by the at least one computing device, voice assistant portions of the voice interaction with the voice assistant platform;
    during the voice interaction with the voice assistant platform, storing, by the at least one computing device, the user portions of the voice interaction and the voice assistant portions of the voice interaction in a sequential order; and
    causing assembly of an assembled voice interaction file by interleaving the stored user portions of the voice interaction with the stored voice assistant portions of the voice interaction based on the sequential order.

2. A method as described in claim 1, wherein the user portions of the voice interaction comprise audio data or text data indicative of speech included as part of a request to the voice assistant platform, and wherein the voice assistant portions of the voice interaction comprise output content returned by the voice assistant platform for output as part of a response to the request.

3. A method as described in claim 2, wherein the output content comprises audio data configured for output by one or more speakers.

4. A method as described in claim 1, wherein the user portions of the voice interaction and the voice assistant portions of the voice interaction are stored in sequential order by associating a time stamp with each respective user portion and voice assistant portion of the voice interaction.

5. A method as described in claim 1, further comprising generating a manifest file that references the stored user portions of the voice interaction and the stored voice assistant portions of the voice interaction in the sequential order.

6. A method as described in claim 1, wherein the assembled voice interaction file comprises voice commands spoken by a user during the voice interaction with the voice assistant platform and respective output content returned for output by the voice assistant platform in response to the respective voice commands, the voice commands and the output content configured for output during playback of the assembled voice interaction file in the sequential order.

7. A method as described in claim 6, wherein the assembled voice interaction file further comprises a user interaction with a user interface displayed by the voice assistant platform, the user interaction with the user interface configured for visual output during playback of the assembled voice interaction file.

8. A method as described in claim 1, wherein the assembly of the assembled voice interaction file comprises inserting at least one time delay between a voice command of respective user portion of the voice interaction and corresponding output content of a respective voice assistant portion of the voice interaction.

9. A method as described in claim 1, wherein the assembled voice interaction file is assembled in response to a user request to end the voice interaction with the voice assistant platform.

10. A method as described in claim 1, wherein the assembled voice interaction file comprises a video file with a visual playback interface and containing the user portions and the voice assistant portions of the voice interaction.

11. In a digital medium environment to record a voice interaction with a voice assistant platform, a method implemented by a computing device, the method comprising:
- capturing, by one or more microphones of the computing device, a voice command from a user;
- communicating, by the computing device, a request including the voice command to the voice assistant platform;
- receiving, by the computing device, a response from the voice assistant platform, the response including output content corresponding to the voice command and configured for output by the computing device;
- storing, by the computing device, the voice command of the request communicated to the voice assistant platform and the output content of the response received from the voice assistant platform in a sequential order; and
- outputting an assembled voice interaction file that includes the voice command and the output content, the assembled voice interaction file assembled by interleaving the stored voice command of the request with the stored output content of the response.

12. A method as described in claim 11, further comprising:
- displaying a voice interaction assembly interface on a display device of the computing device;
- receiving, via the voice interaction assembly interface, user input to initiate recording of the voice interaction with the voice assistant platform; and
- wherein the capturing occurs in response to the user input to initiate recording of the voice interaction.

13. A method as described in claim 12, further comprising displaying, via the voice interaction assembly interface, a voice assistant status indicating in real time a current status of the voice assistant platform during the voice interaction.

14. A method as described in claim 11, wherein the assembled voice interaction file comprises an audio file containing the voice command and the output content.

15. A method as described in claim 11, wherein the assembled voice interaction file comprises a video file with a visual playback interface and containing the voice command and the output content.

16. A method as described in claim 15, further comprising:
- displaying a playback editing interface on a display device of the computing device;
- receiving, via the playback editing interface, user input to modify the playback interface of the assembled voice interaction file; and
- wherein the assembled voice interaction file is assembled based at least in part on the user input to modify the playback interface.

17. A method as described in claim 16, wherein the user input modifies a visual style of the playback interface of the assembled voice interaction file.

18. A system to record a voice interaction with a voice assistant platform, the system comprising:
- a display device;
- at least one processor; and
- memory having stored thereon computer-readable instructions that are executable by the at least one processor to perform operations including:
  - causing display of a voice interaction assembly interface on the display device;
  - receiving, via the voice interaction assembly interface, user input to initiate recording of the voice interaction with the voice assistant platform;
  - during the voice interaction with the voice assistant platform, storing user portions of the voice interaction and voice assistant portions of the voice interaction in a sequential order; and
  - receiving, via the voice interaction assembly interface, user input to end recording of the voice interaction with the voice assistant platform; and
  - causing assembly of an assembled voice interaction file by interleaving the stored user portions of the voice interaction with the stored voice assistant portions of the voice interaction based on the sequential order.

19. A system as described in claim 18, wherein the user portions of the voice interaction comprise audio data or text data indicative of speech included as part of a request to the voice assistant platform, and wherein the voice assistant portions of the voice interaction comprise output content returned by the voice assistant platform for output as part of a response to the request.

20. A system as described in claim 18, wherein the operations further comprise generating a manifest file that references the stored user portions of the voice interaction and the stored voice assistant portions of the voice interaction in the sequential order.

* * * * *